US008050414B2

(12) United States Patent  
Givens

(10) Patent No.: US 8,050,414 B2
(45) Date of Patent: Nov. 1, 2011

(54) ROBUST PIPE-STRIKE PULSE DETECTOR

(75) Inventor: Maurice Givens, Chicago, IL (US)

(73) Assignee: Gas Technology Institute, Des Plaines, IL (US)

( * ) Notice: Subject to any disclaimer, the term of this patent is extended or adjusted under 35 U.S.C. 154(b) by 641 days.

(21) Appl. No.: 12/252,903

(22) Filed: Oct. 16, 2008

(65) Prior Publication Data

US 2010/0098260 A1  Apr. 22, 2010

(51) Int. Cl.
  *G01M 7/00* (2006.01)
(52) U.S. Cl. .................. 381/56; 381/94.08; 73/12.08
(58) Field of Classification Search .............. 381/56, 381/94.08; 73/12.08, 204.14
  See application file for complete search history.

(56) References Cited

U.S. PATENT DOCUMENTS

| | | | |
|---|---|---|---|
| 5,781,144 A | 7/1998 | Hwa | |
| 6,795,559 B1 * | 9/2004 | Taura et al. | 381/94.8 |
| 6,873,644 B1 | 3/2005 | Barrett | |
| 7,171,161 B2 | 1/2007 | Miller | |
| 7,492,908 B2 * | 2/2009 | Griesinger | 381/56 |
| 7,706,542 B2 * | 4/2010 | Suganuma | 381/13 |
| 2003/0060723 A1 | 3/2003 | Joo et al. | |
| 2004/0039419 A1 | 2/2004 | Stickney et al. | |
| 2004/0039420 A1 | 2/2004 | Jayne et al. | |
| 2004/0116969 A1 | 6/2004 | Owen et al. | |
| 2005/0240234 A1 | 10/2005 | Joo et al. | |
| 2006/0167515 A1 | 7/2006 | Stickney et al. | |
| 2008/0240462 A1 * | 10/2008 | Pennock | 381/86 |

* cited by examiner

*Primary Examiner* — Benjamin Sandvik
(74) *Attorney, Agent, or Firm* — Mark E. Fejer

(57) ABSTRACT

A method for discriminating a noise pulse from a background noise in which a signal of interest is converted to an envelope signal using an entropy-based envelope generator, which envelope signal is then integrated over a plurality of consecutive integrative periods, producing an integrated envelope signal for each of the integration periods. The ratio of the envelope signal at the end of each of the integration periods corresponding to each corresponding said integrated envelope signal is determined and compared with a predetermined threshold signal for each of the integration periods, resulting in a comparison value. The integration period in which the comparison value exceeds the predetermined threshold signal and which is preceded by two integration periods in which the comparison value does not exceed the threshold value represents the point in time at which the noise pulse is detected.

6 Claims, 7 Drawing Sheets

ROBUST PIPE-STRIKE PULSE DETECTOR

BACKGROUND OF THE INVENTION

1. Field of the Invention

In one aspect, this invention relates to a method for differentiating a noise pulse from background noise. In another aspect, this invention relates to a method and apparatus for differentiating between the noise generated by contact with underground objects and background noise. In yet another aspect, this invention relates to a method and apparatus for detecting contacts with underground objects such as utility pipelines. In yet another aspect, this invention relates to a method for evaluating the quality and condition of butt-fusion joints in plastic pipe.

2. Description of Related Art

Underground pipelines are widely used to transport a variety of fluids, including oil, natural gas, water, etc., from one place to another. Such underground systems are subject to damage from a variety of sources, both naturally occurring and man-made. For example, subsidence of the soil, local construction projects, seismic activity, and weather can all lead to defects and anomalies in the pipeline. Also, harsh environments can cause pipelines to move gradually over time, leading to defects, cracks, leaks, bumps, and other anomalies, within the interior of the pipeline.

Continuous monitoring of long pipelines, whether for seismic events or impacts occurring during excavation in proximity to the pipeline, is not a simple task. Damage to pipelines can be detected in a variety of ways including detection of the substance that escapes from the pipeline as the result of the damage, pressure drops in the pipeline, and impacts on the pipeline. And, when construction equipment, for example, a backhoe, strikes an underground utility pipeline, an acoustic signal is generated that propagates along the length of the pipeline.

There are several systems and methods known to those skilled in the art for monitoring the condition of underground pipelines. Acoustic monitoring of an underground pipeline may be carried out by a variety of acoustic sensors/detectors, such as geophones, accelerometers and the like. However, one problem with the use of acoustic means for monitoring underground pipelines is noise, both background and sensor noise, in the output signal from these means, which noise may partially or possibly completely mask the signal of interest, thereby precluding detection of the pipeline condition. For example, while sounds associated with impacts on a pipeline can be transmitted through the pipeline and detected at substantial distances from the point of contact via such highly sensitive acoustic sensors, the high sensitivity of such sensors can produce or result in a significant number of false calls arising from sources such as nearby traffic, passing pedestrians, low-level ground movement, and weather conditions such as thunder. Accordingly, to better enable the use of acoustic means for monitoring underground pipelines, one alternative is to substantially reduce or, if possible, eliminate the noise in the output signals from the acoustic sensors/detectors. Another alternative is to utilize the characteristics of the noise generated by the impact to distinguish the impact noise from the background noise.

SUMMARY OF THE INVENTION

Accordingly, it is one object of this invention to provide a method for discriminating between a noise pulse and background noise.

It is one object of this invention to provide a method for detecting an impact by an object with an underground pipeline.

These and other objects of this invention are addressed by a method for discriminating a noise pulse from a background noise comprising the steps of converting a signal of interest to an envelope signal using an entropy-based envelope generator, integrating the envelope signal over a plurality of consecutive integrative periods, producing an integrated envelope signal for each of the integration periods, determining a ratio of the envelope signal at the end of each said integration period corresponding to each corresponding integrated envelope signal, comparing the ratio for each integration period with a predetermined threshold signal for each of the integration periods, resulting in a comparison value, and setting a flag for each integration period in which the comparison value exceeds the predetermined threshold signal. The integration period in which a flag is set which is preceded by two integration periods in which no flags are set corresponds to the beginning of a noise pulse. The method of this invention may be applied when pulse detection is required for Poisson-, Erlang-, or log normal-distributed pulses and distributed pulses similar thereto. The method is not suitable for use with Gaussian-distributed pulses or distributed pulses similar thereto.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

Figure 1:
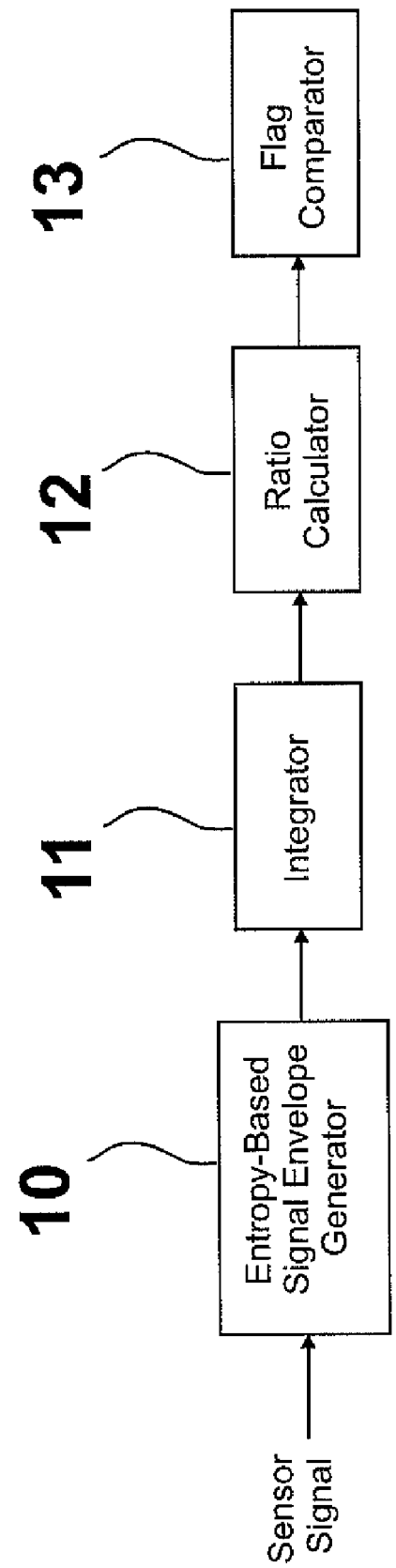
FIG. 1 is a schematic representation of a system for discriminating between noise pulses and background noises.

The invention disclosed herein provides a means of detecting pulses that are a result of one or more sensor responses to an impact between two objects. The invention is particularly beneficial for use in detecting pulses arising out of an underground pipeline being struck. The invention is robust against wideband noise, Gaussian distributed noise, and impulsive noise. When used in connection with underground pipelines, the sensor output is typically a burst of noise corresponding to a strike on the pipeline. The strike may be due to encroachment and contact from construction equipment, falling rock in hilly or mountainous regions, shifting of the pipeline from ground movements arising, for example, from earthquakes, and the like.

It will be appreciated that the invention is not limited to pipeline strikes and can be used whenever pulse detection is required for Poisson-distributed pulses, Erlang-distributed pulses, log normal-distributed pulses and pulses similar thereto. The pulse may be a burst of signal such as a noise burst, a burst of sinusoidal signal, a chirp, or a dc level change.

The basis of the method of this invention is the use of signal entropy (energy of the signal) as opposed to signal value. Accordingly, the signal from the sensor is first converted to an envelope signal using an entropy-based envelope generator, producing an envelope signal. The entropy-based envelope generator is implemented in accordance with the formula $$w = \sqrt{\frac{2\log(n)}{n}} \, STD(x)$$

where n is the period over which the integration is performed, STD is the statistical standard deviation, and x is a vector of the input signal of dimension equal to the integration interval. The envelope signal is then integrated over an integration period, referred to herein as the present integration period, producing an integrated envelope signal. The integrator is implemented as an exponential integrator in accordance with the formula $$y(k) = y(k-1)(1-\alpha) + w(k)\alpha$$

which is calculated for each input sample over the integration period with y(k) being the present interim calculation, y(k−1) being the previous interim calculation (y(0)=0), w(k) is the present entropy-based envelope sample, and α is the integration control. The integrator output is the final value calculated over the integration period.

A ratio of the envelope signal to the integrated envelope signal is determined at the end of the present integration period, compared against a predetermined threshold value and compared against the ratios with respect to the threshold value of two integration periods immediately preceding the integration period. The ratios for the preceding two integration periods are also taken at the end of their respective integration periods. If the ratio of the present integration period exceeds the predetermined threshold value and the ratio of the integration period immediately preceding the present integration period does not exceed the threshold value, a flag corresponding to the present integration period is set. This flag is than compared to the flag of the second previous integration period. If no flag has been set for the second previous integration period, then an impact is declared.

To state it another way, let flag (n) be the flag for the present integration period; let flag(n−1) be the flag for the integration period immediately preceding the present integration period; and let flag(n−2) be the flag for the second integration period preceding the present integration period. If the ratio of the envelope signal and the integrated envelope signal exceeds the threshold value, β, and flag(n−1) is not set (because the ratio of the envelope signal and the integrated envelope signal for the integration period immediately preceding the present integration period does not exceed the threshold value), the flag(n) is set for the present integration period. If flag(n−2) also is not set (because the ratio of the envelope signal and the integrated envelope signal for the second integration period immediately preceding the present integration period does not exceed the threshold value), then an impact is declared to have occurred.

FIG. 1 is a schematic representation of a system for discriminating between noise pulses and background noises in accordance with the method of this invention. As shown therein, the system comprises an entropy-based signal envelope generator 10 into which a sensor signal is input. The output of the entropy-based signal envelope generator is introduced into an integrator 11 for performance of the envelope integration. The output from the integrator, i.e. the integrated envelope signal, is introduced into a ratio calculator 12 in which the ratio of the envelope signal and the integrated envelope signal is calculated, which ratio is then introduced into flag comparator 13.

Figure 2:
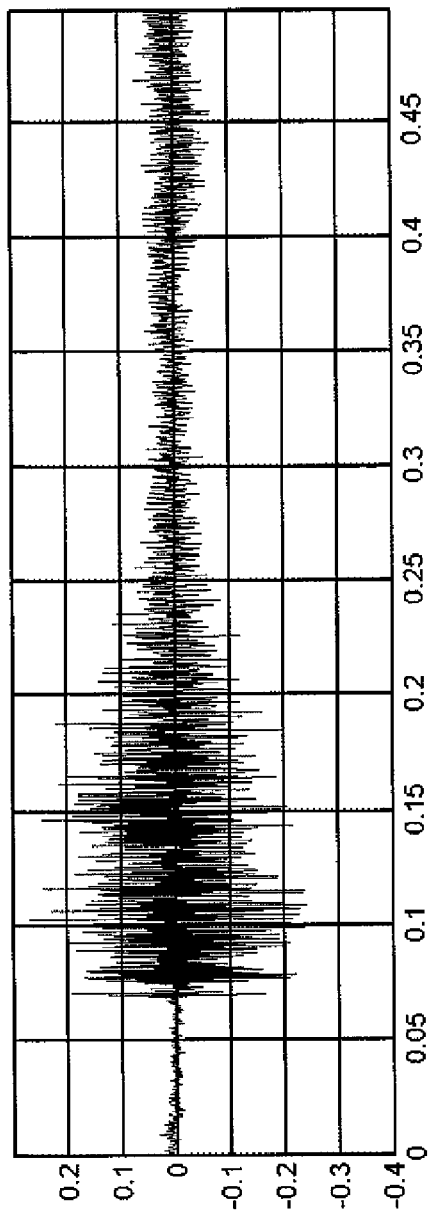
FIG. 2 is a diagram showing a sensing device signal output from a pipe having been struck by an object with no background noise and the envelope generated by the entropy-based envelope generator in accordance with the method of this invention.
Figure 2:
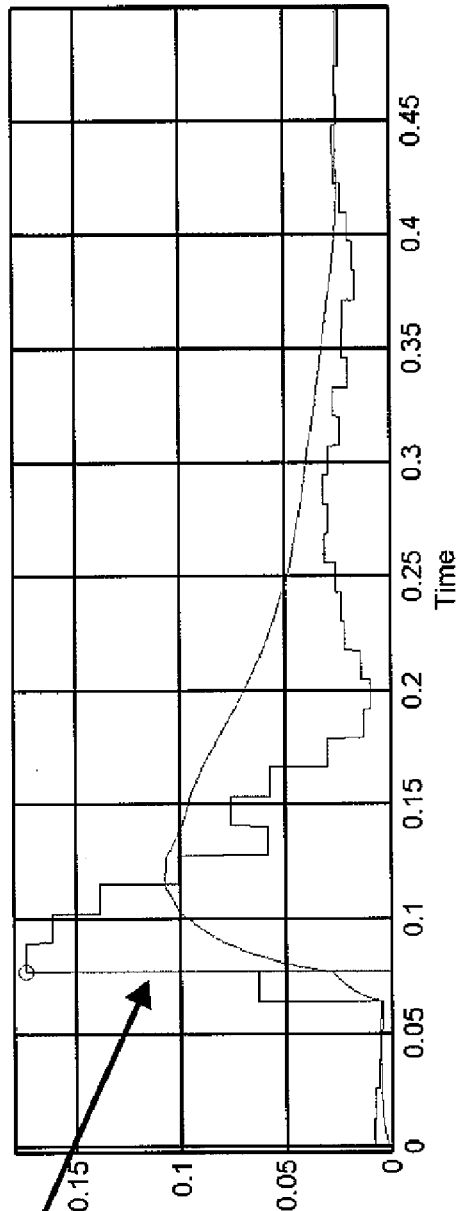

In FIG. 2, two plots are shown relating to a pipeline strike and the establishment of the occurrence of a pipeline strike in accordance with the method of this invention. The top plot shows a sensing device signal output when the pipeline has been struck. The bottom plot shows the envelope generated by the entropy-based envelope generator and a line, indicated by arrow 15, representative of the time at which the declaration of a pipeline strike was made in accordance with the method of this invention.

Figure 3:
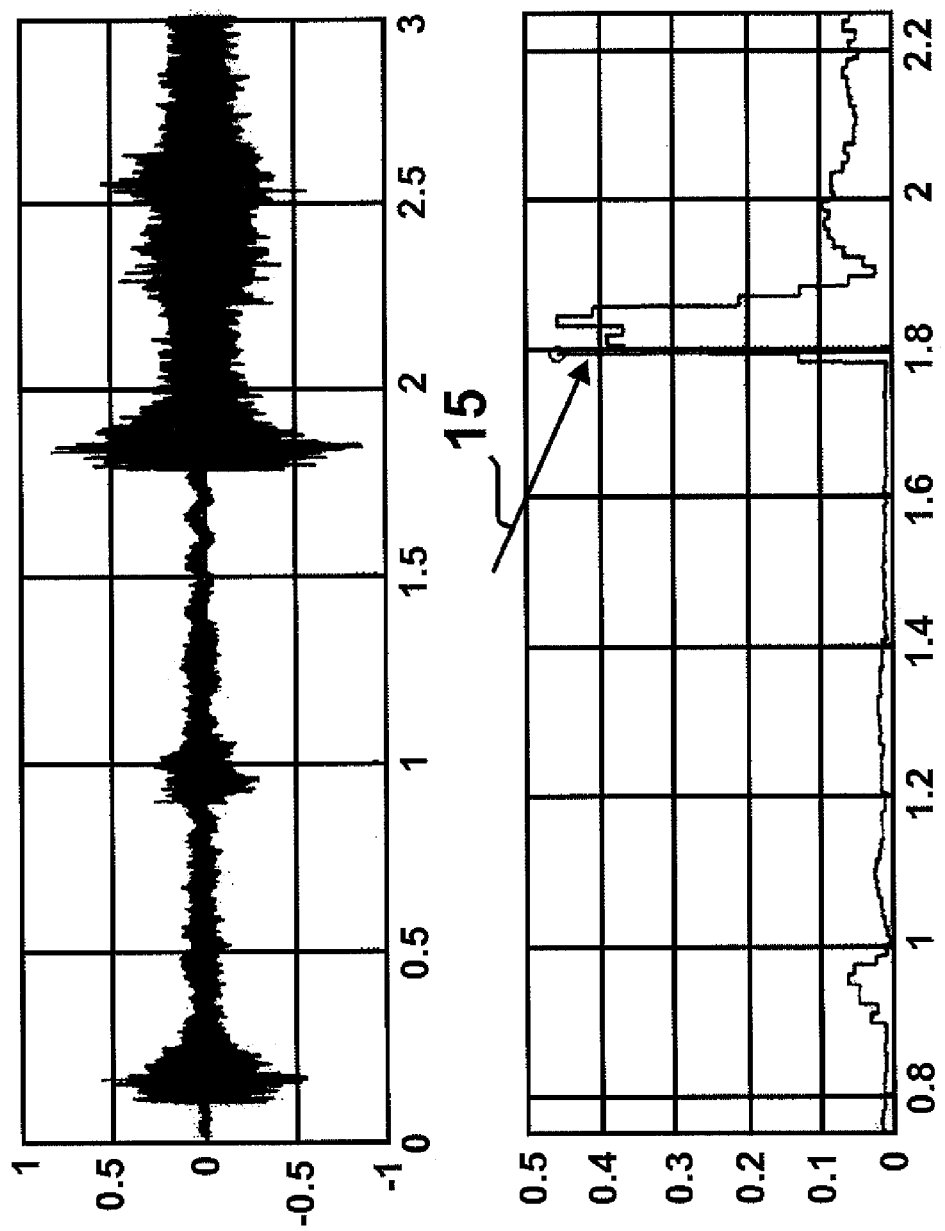
FIG. 3 is a diagram showing a sensing device signal output from a pipe having been struck by an object in the presence of background noises and the envelope generated by the entropy-based envelope generator in accordance with the method of this invention.

In FIG. 3, two plots are shown also relating to a pipeline strike and the establishment of the occurrence of a pipeline strike in accordance with the method of this invention. However, in this case, other noises, as evidenced by the sensing device signal output prior to the time at which the pipeline strike occurs as shown in the top plot, were present at the time of the pipeline strike. As before, the bottom plot shows the envelope generated by the entropy-based envelope generator and a line representative of the time at which the declaration of the pipeline strike was made in accordance with the method of this invention.

Figure 4:
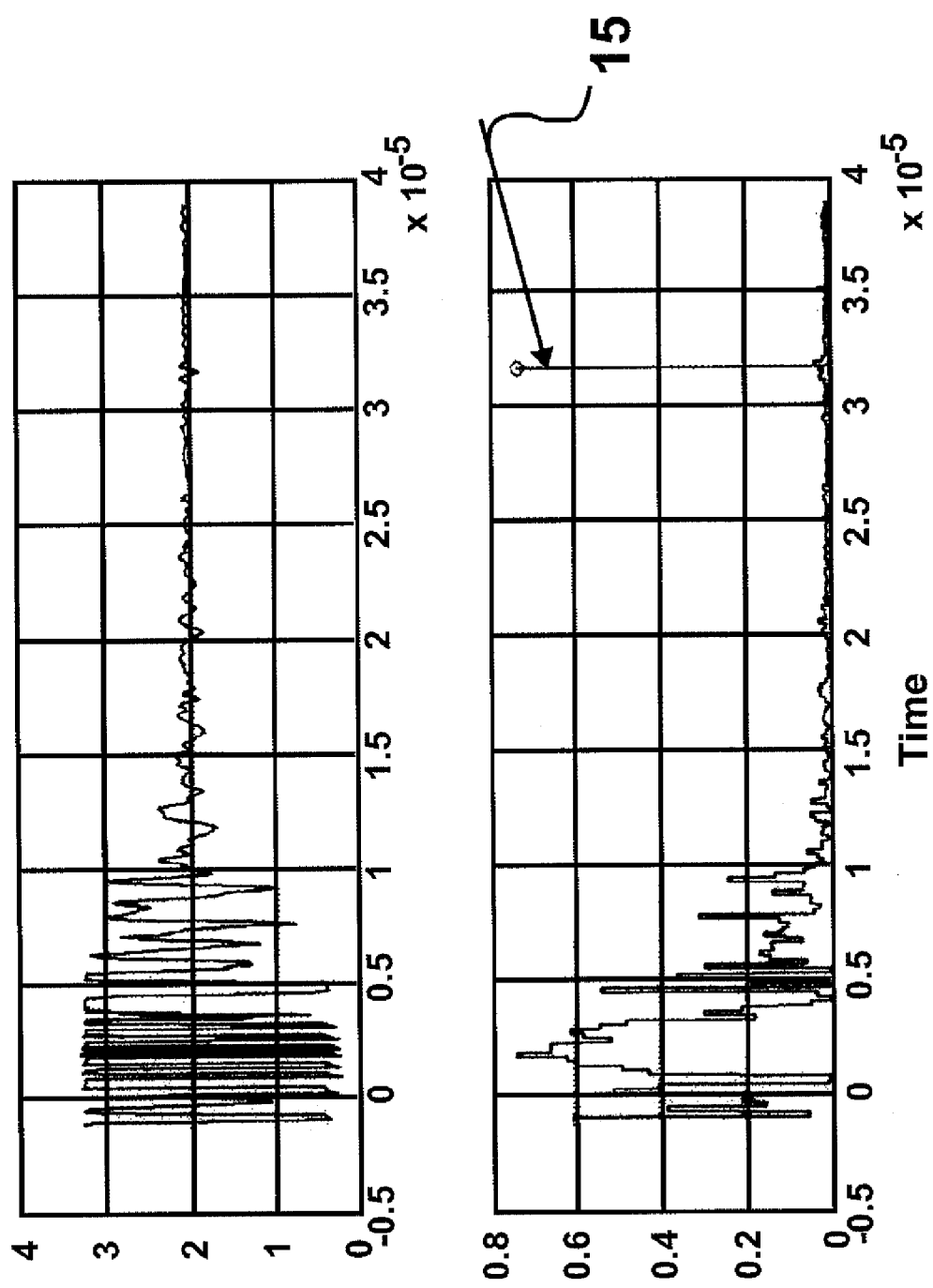
FIG. 4 is a diagram showing a sensing device signal output from the reflection of an ultrasonic signal employed in butt-fusion testing of a pipe fusion joint for a good joint, the envelope generated by the entropy-based envelope generator, and the point where the detector determined a valid echo occurred as determined in accordance with the method of this invention.
Figure 5:
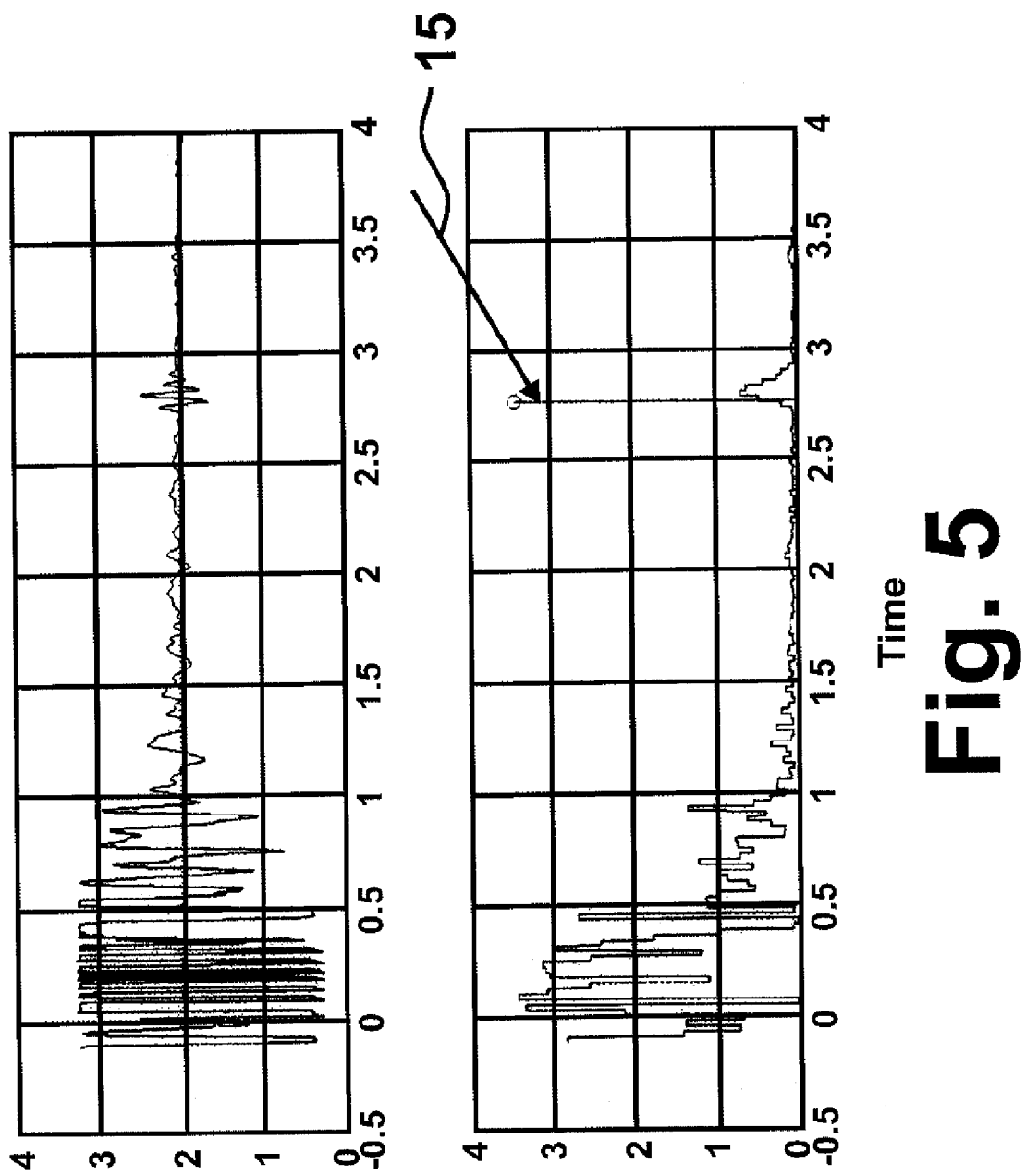
FIG. 5 is a diagram showing a sensing device signal output from the reflection of an ultrasonic signal employed in butt-fusion testing of a pipe fusion joint for a compromised fusion joint, the envelope generated by the entropy-based envelope generator, and the point where the detector determined a valid echo occurred as determined in accordance with the method of this invention.

As previously indicated, the method of this invention may be used to detect the presence of a pulse in any applications producing Poisson-distributed pulses, Erlang-distributed pulses, log normal-distributed pulses and pulses similar thereto. FIG. 4 shows two plots from an application in which an ultrasonic butt-fusion testing device is used to distinguish between good and bad butt-fusion joint welds of joined sections of plastic pipe. In this application, when the joint welds are good, an ultrasonic signal can be bounced off the inner wall of the pipe. This reflection is detected and the time of flight measured for a preliminary determination of the integrity of the joint weld. The time of flight of the reflected ultrasonic signal, taking into consideration parameters such as pipe size and pipe wall thickness which can affect the time of flight measurement, will fall within a certain time frame following generation of the ultrasonic signal for a good joint weld and will fall outside of the time frame for a bad joint weld. The top plot in FIG. 4 shows the ultrasonic signal received by the sensor used to detect the reflection and the bottom plot shows the envelope generated by the entropy-based envelope generator and the point in time at which a pulse representative of a valid echo is determined to have occurred in accordance with the method of this invention. The plots in FIG. 4 are for a good joint weld. FIG. 5 shows the plots obtained in connection with a joint weld that is compromised, such as due to an obstruction. In this case, the pulse detector determines that the time of flight is incorrect, i.e. outside of the time frame for a good joint weld, a condition representative of a joint weld flaw.

Figure 6:
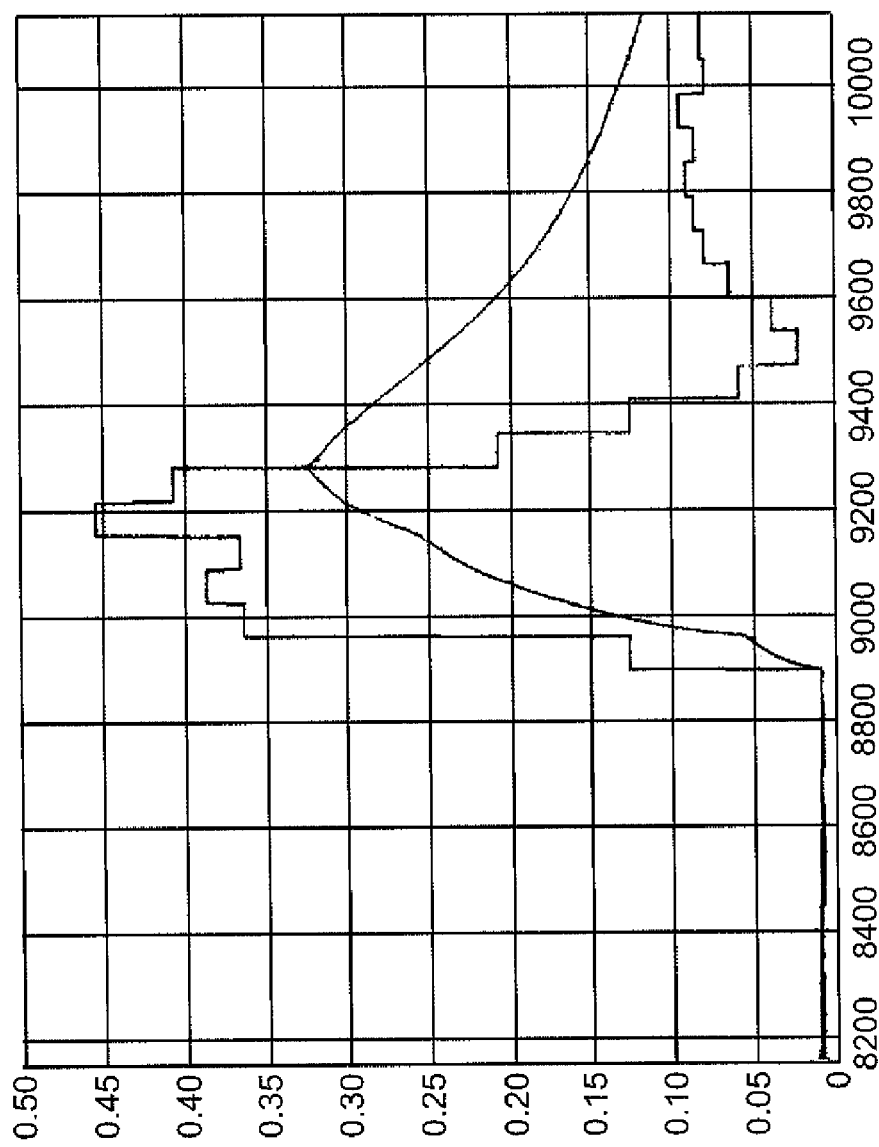
FIG. 6 is a diagram showing an exemplary plot of an entropy-based envelope together with an exemplary plot of a corresponding integrated envelope signal for determining a threshold value.
Figure 7:
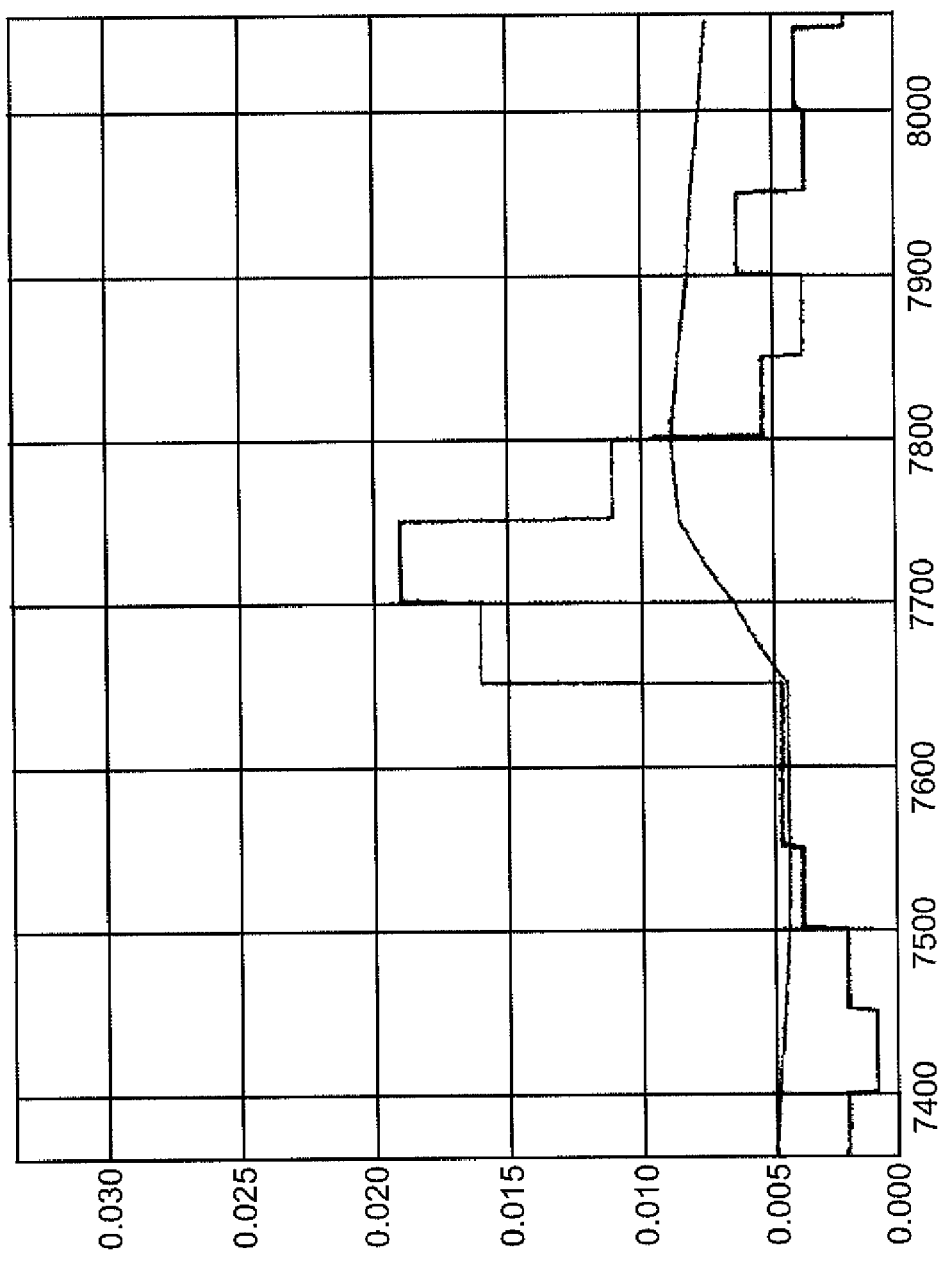
FIG. 7 is another diagram showing an exemplary plot of an entropy-based envelope together with an exemplary plot of a corresponding integrated envelope signal for determining a threshold value.

The threshold value is a function of the ratio of the peak level integrated envelope signal to the maximum level of the entropy-based envelope. For example, referring to FIG. 6, the ratio of the peak level integrated envelope signal to the maximum level of the entropy-based envelope is 2:3. The threshold value is 6 times this ratio, or 4. Thus, a flag is set whenever the ratio of the envelope signal to the integrated envelope signal is greater than or equal to 4. In another example, referring to FIG. 7, the ratio of the peak level integrated envelope signal to the maximum level of the entropy-based envelope is in the range of about 0.38 to about 0.45. At 0.38, the threshold is set as 6 times this ratio, or 2.3. While a multiplier of 6 times the ratio of peak level integrated envelope signal to the maximum level of the entropy-based envelope is not the only multiplier that will work, I have found that it provides the best results. I have also determined that a ratio of the peak level integrated envelope signal to the maximum level of the entropy-based envelope in the range of about 1:3 to about 2:3 provides the best results.

Although pulse detection is used in a variety of practical applications including data detection, dial-pulse detection, communications systems, biomedical systems, seismic activity detection, heart monitors, radar systems, etc., the techniques used in these application for pulse detection are not effective in the applications of pipeline strike detection and butt-fusion joint weld testing discussed herein above. Because the method of this invention discriminates against Gaussian-, wideband-, and impulsive-type noise, it is much less susceptible to general noise and noise bursts present in pipeline environments.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

What is claimed is:

1. A method for discriminating a noise pulse from a background noise comprising the steps of:

converting a signal of interest to an envelope signal using an entropy-based envelope generator;

integrating said envelope signal over a plurality of consecutive integrative periods, producing an integrated envelope signal for each of said integration periods;

determining a ratio of said envelope signal at an end of each said integration period corresponding to each corresponding said integrated envelope signal;

comparing said ratio for each said integration period with a predetermined threshold signal for each of said integration periods, resulting in a comparison value;

setting a flag for each integration period in which said comparison value exceeds said predetermined threshold signal; and identifying a first said integration period in which said flag is set following two said integration periods in which no flags are set, said flag corresponding to a noise pulse in said signal of interest.

2. The method of claim 1, wherein said integration is implemented as an exponential integrator.

3. The method of claim 1, wherein said background noise is selected from the group consisting of wideband noise, Gaussian distribution noise, impulsive noise, and combinations thereof.

4. The method of claim 1, wherein said noise pulse is generated by a signal burst selected from the group consisting of a noise burst, a sinusoidal signal burst, a chirp, and a dc level change.

5. The method of claim 1, wherein said entropy-based envelope generator is implemented in accordance with the formula $$w = \sqrt{\frac{2\log(n)}{n}} STD(x)$$

where n is the period over which the integration is performed, STD is the statistical standard deviation, and x is a vector of the input signal of dimension equal to the integration interval.

6. The method of claim 1, wherein said noise pulse is of a type selected from the group consisting of Poisson-distributed pulses, Erlang-distributed pulses, and log normal-distributed pulses.

* * * * *